United States Patent Office 2,862,833
Patented Dec. 2, 1958

2,862,833

REGENERATED CELLULOSE FILAMENTARY MATERIAL

Robert W. Singleton, Florham Park, William B. Horback, Irvington, and Jesse L. Riley and Basil S. Sprague, New Providence, N. J., assignors to Celanese Corporation of America, New York, N. Y., a corporation of Delaware No Drawing. Application October 27, 1955
Serial No. 543,274

5 Claims. (Cl. 117—7)

This invention relates to regenerated cellulose and relates more particularly to filamentary material having a basis of regenerated cellulose obtained by the saponification of a stretched wet-spun cellulose ester.

Filamentary materials of very high tenacity, e. g. over 7 or 8 grams per denier, may be obtained by wet-spinning and stretching cellulose acetate or other cellulose ester (as described for example in the copending application of Bradshaw et al., Serial No. 285,238, filed April 30, 1952, now Patent No. 2,732,586), followed by saponification of said cellulose ester to convert it to cellulose. The resulting filamentary materials are highly crystalline as shown by their characteristic X-ray diffraction pattern. Because of their high tenacity such filamentary materials are eminently suitable for industrial purposes, for example in combination with rubber in such articles as power transmission belts and fire hose. However, it is found that on exposure to sunlight the filamentary materials lose some of their strength, which is obviously undesirable.

It is therefore, an object of this invention to provide a filamentary material having a basis of regenerated cellulose obtained by the saponification of a stretched wet-spun cellulose ester, which filamentary material will have improved resistance to sunlight.

Other objects of this invention will be apparent from the following detailed description and claims. In said description and claims all proportions are by weight unless otherwise indicated.

In accordance with one aspect of this invention a small amount of an ultra-violet light stabilizer is incorporated into the filamentary material having a basis of regenerated cellulose obtained by the saponification of a stretched wet-spun cellulose ester. Various types of ultra-violet light stabilizers have been found to be effective. Thus, in one embodiment 1 to 3% of carbon black may be employed with very good results. Ultra-violet light stabilizers containing epoxy groups and stabilizers containing phenolic groups, e. g. p-cyclohexyl phenol or p-octyl phenol, may also be used. However, especially good results have been obtained by the use of resorcinol monobenzoate as the stabilizer. The use of this material in filaments of regenerated cellulose obtained by the saponification of a stretched wet-spun cellulose ester provides excellent protection against loss of strength due to exposure to ultra-violet light even when very small amounts of the resorcinol monobenzoate are employed. Also, the resorcinol monobenzoate is not removed from the filaments by mild scouring treatments and its presence does not cause any discoloration of the filament. Filaments carrying this material do not tend to stiffen and subsequently weaken on exposure to high temperatures for long periods of time. In contrast, the presence of other stabilizers of similar chemical structure, such as phenyl salicylate, does result in stiffening and subsequent weakening on prolonged heat treatment, of the filaments of regenerated cellulose obtained by the saponification of a stretched wet-spun cellulose ester.

The ultra-violet light stabilizer may be applied to the filamentary material having a basis of regenerated cellulose obtained by the saponification of a stretched wet-spun cellulose ester in any convenient manner. For some stabilizers such as carbon black, it is advantageous to incorporate the stabilizer into the cellulose ester before the latter is wet-spun, as by mixing a dispersion of the carbon black with a spinning solution containing the cellulose ester and a solvent for said cellulose ester. In other cases, it is more advantageous to apply the ultra-violet light stabilizer to the regenerated cellulose filaments, for example by passing the filaments, in yarn or fabric form, through a solution or emulsion of the stabilizer or by spraying or wiping said solution or emulsion onto said filaments followed by drying of the solution or emulsion on the filaments. 0.1 to 3% or even 5%, based on the weight of the filamentary material, of resorcinol monobenzoate may be applied to the filamentary material by padding on a solution of said stabilizer in alcohol, acetone or benzene. It is found that the stabilizer is much more effective when it is applied to the surfaces of the filamentary material instead of being dispersed throughout the filamentary material.

The following examples are given to illustrate this invention further.

*Example I*

A spinning solution of cellulose acetate in acetone is uniformly blended with 2%, based on the weight of the cellulose acetate, of carbon black. The solution is then wet-spun and stretched, and the resulting yarn is then completely saponified by the use of a sodium hydroxide solution. The yarn has a tenacity of 8.0 grams per denier. On exposure for a period of time to the concentrated ultra-violet light from a mercury vapor lamp it retains 87.1% of its original tenacity. In contrast, an identical yarn made without carbon black retains only 60–70% of its original tenacity after the same test.

*Example II*

A yarn of saponified stretched wet-spun cellulose acetate is prepared in the manner described in Example I except that no carbon black is used. The yarn is then paded with a solution of resorcinol monobenzoate in ethyl alcohol so that the yarn takes up ½% of its weight of the resorcinol monobenzoate. On exposure to ultra-violet light as in Example I the yarn retains 88.4% of its original tenacity.

It is to be understood that the foregoing detailed description is given merely by way of illustration and that many variations may be made therein without departing from the spirit of this invention.

Having described our invention, what we desire to secure by Letters Patent is:

1. A filamentary material having a basis of regenerated cellulose obtained by the saponification of stretched wet-spun cellulose ester, said filamentary material having incorporated therein about 0.1 to 5% of resorcinol monobenzoate.

2. A filamentary material having a tenacity of at least 7 grams per denier and having a basis of regenerated cellulose obtained by the saponification of stretched wet-spun cellulose acetate, said filamentary material having incorporated therein about 0.1 to 5% of resorcinol monobenzoate.

3. A filamentary material as set forth in claim 2 in which the resorcinol monobenzoate is present substantially entirely on the surfaces of the filamentary material.

4. Process for enhancing the properties of a high tenacity filamentary material comprising a saponified stretched wet-spun cellulose acetate which comprises incorporating therein about 0.1 to 5% of resorcinol monobenzoate as an ultra-violet light stabilizer therefor.

5. Process as set forth in claim 4 in which a solution of the stabilizer is applied to the surfaces of said filamentary material so as to deposit 0.1 to 3% of said stabilizer on said surfaces.

References Cited in the file of this patent
UNITED STATES PATENTS

| | | |
|---|---|---|
| 2,086,418 | Hunt et al. | July 6, 1937 |
| 2,684,311 | Fortess | July 20, 1954 |